May 23, 1944.    A. SETZER    2,349,763
ELECTRIC STORAGE BATTERY
Filed Feb. 4, 1941
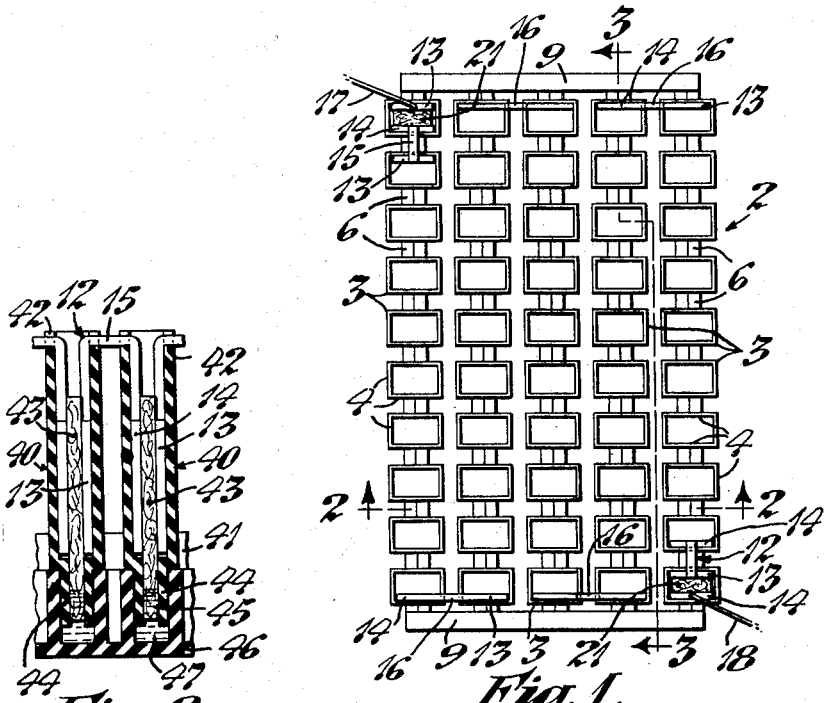
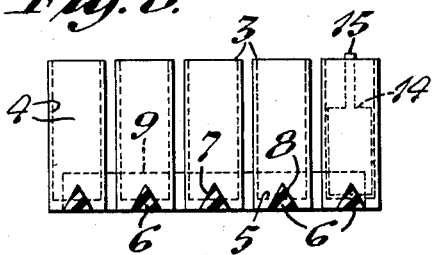
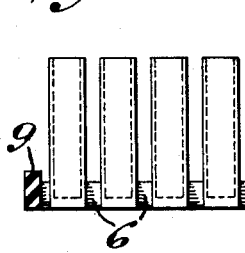
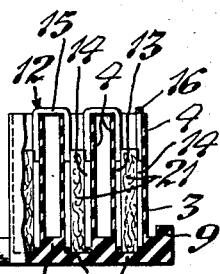
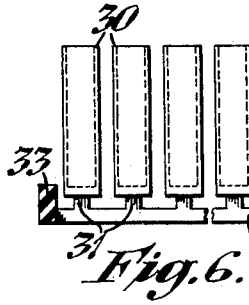
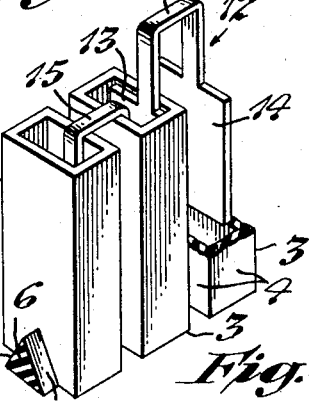
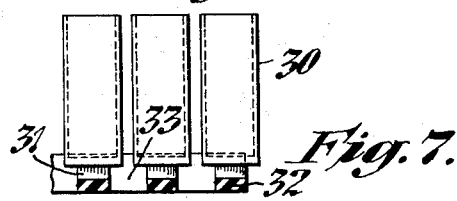
Inventor:
Albert Setzer
By Pennington and White
Attorneys.

Patented May 23, 1944

2,349,763

UNITED STATES PATENT OFFICE 2,349,763

ELECTRIC STORAGE BATTERY

Albert Setzer, North Scituate, R. I.

Application February 4, 1941, Serial No. 377,325

4 Claims. (Cl. 136—166)

The present invention relates to electric batteries and more particularly to batteries of the secondary wet cell type commonly known as storage batteries.

The battery illustrated and described herein is adapted for various uses and particularly suited for supplying electric current to radio sending units carried by trial balloons. Trial balloons are quite extensively used for weather observations and are adapted to carry a radio unit to the extreme altitude of fifteen or twenty miles. During the ascent of a trial balloon the radio sending unit automatically transmits signals indicating such data as temperature, relative humidity and the like at different altitudes. At a critical height for the particular balloon the latter bursts and the radio sending unit and battery descend and are only rarely recovered.

One of the objects of the present invention is to provide an electric storage battery which is extremely small and compact, of light weight, and economical to manufacture to adapt it for use with trial balloons.

Another object of the invention is to provide a battery of the type indicated in which the series of cells are spaced from each other to permit the escape of any overflow of electrolyte between the cells to prevent short-circuiting of adjacent cells.

Another object of the invention is to provide a battery of the type indicated in which the cell-jars are joined by integral straps or rails to provide a unitary structure.

Another object of the invention is to provide a battery of the type indicated in which the positive electrode of one cell and the negative electrode of an adjacent cell are formed as a unitary structure adapted to be slid into proper relationship in adjacent cell-jars;

Still another object of the invention is to provide a battery of the type indicated in which the electrolyte may be supplied to the cells by capillary attraction.

Further objects of the invention are set forth in the following specification which describes several forms of construction of the battery, by way of example, as illustrated by the accompanying drawing. In the drawing:

Fig. 1 is a full scale plan view of a battery incorporating the novel features of the present invention;

Fig. 2 is a transverse sectional view taken on line 2—2 of Fig. 1 showing the triangular form of the rail connecting the cell-jars of each row;

Fig. 3 is a longitudinal sectional view taken on line 3—3 of Fig. 1 showing the rails for connecting the ends of the rows of cell-jars to form a unitary structure;

Fig. 4 is an enlarged perspective view of several adjacent cell-jars shown partly in section and illustrating the manner of applying the positive and negative electrodes to adjacent cells;

Fig. 5 is a partial plan view similar to Fig. 1 showing a modified form of construction of the battery casing;

Fig. 6 is a transverse sectional view taken on line 6—6 of Fig. 5 showing a row of cell-jars positioned above the supporting rail for the row;

Fig. 7 is a longitudinal sectional view taken on line 7—7 of Fig. 5 showing the supporting rails for the rows of cell-jars connected by longitudinal side rails to provide a unitary battery casing; and Fig. 8 is a longitudinal sectional view of a pair of adjacent cell-jars of modified construction for adapting the electrolyte to be supplied thereto by capillary attraction.

Heretofore, batteries used with trial balloons have usually been of the primary dry cell type which have the disadvantage of rapid deterioration or short shelf-life. For instance, during the time necessary to transport dry cell batteries to outlying possessions, such as Alaska, Hawaii, Panama Canal Zone or the like, the batteries are usually completely exhausted. Furthermore, dry cell batteries used with trial balloons have a limited capacity and are not dependable, especially at the low temperatures to which they are subjected.

Wet cell storage batteries have also been used with trial balloons, but only to a limited extent because of their excessive weight and cost and further due to the fact that when the cells are made extremely small and connected in series they do not give the additive voltage of the plurality of cells. The present invention resides in part in providing a storage battery of minimum size, extreme compactness and light weight to adapt it for use with trial balloons; and further in overcoming the defects which cause the cells to be short-circuited when the battery is of such limited dimensions. When minute cell-jars of a storage battery are arranged in closely adjacent relationship with a single wall between cells it has been found by study and observation that the electrolyte creeps up the side and over the top of the wall separating adjacent cells, or travels along the connector strap, to cause short-circuiting of the electrolyte in the adjacent cells. By spacing the cell-jars one from another a predetermined distance such short-circuiting of the cells is eliminated. It has been determined that by proper proportioning the parts of the battery it can be made of sufficient compactness and of minimum weight to adapt it for use with trial balloons. For example, the battery illustrated in full size in Fig. 1 of the present drawing has a weight of less than six ounces, an additive voltage of the plurality of cells and considerably greater capacity than a dry cell battery of the same weight and voltage.

Figs. 1 to 4 of the drawing illustrate a unitary battery frame 2 comprising five rows of cell-jars 3 with ten jars in each row. Each cell-jar 3 is preferably of rectangular form with thin side walls 4, a relatively thicker bottom wall 5 and an open top, see Fig. 3. The cell-jars 3 of each row are connected to each other by integral ribs 6 at the bottom thereof which, together with the bottom walls of the cells, constitute rails extending longitudinally throughout the entire length of the row. The ribs 6 hold the cell-jars 3 of each row in spaced relationship to prevent any electrolyte which may creep up the side walls 4 of the cell-jars from bridging and short-circuiting adjacent cells. The cell-jars 3 are spaced from each other at such a distance as to prevent the electrolyte from bridging between the side walls of adjacent cell-jars by surface tension. Preferably, the connecting ribs 6 are of triangular form in cross-section to provide inclined sides 7 and 8, see Fig. 2, to quickly drain any electrolyte which may escape from the cells. In other words, any electrolyte overflowing from a cell-jar 3, instead of bridging adjacent cells, will run down the outside wall thereof and drain off from the inclined sides 7 and 8 of the ribs 6.

As illustrated in the present drawing, the ribs 6 project beyond the endmost cell-jars 3 of the several rows and are connected by integral transverse rails 9 at opposite ends of the rows to provide a unitary self-supporting frame 2 of fifty cell-jars. In some instances the transverse rails 9 may be formed as integral ribs connecting the cell-jars in the lateral rows in a manner similar to the ribs 6 for connecting the longitudinal rows. The transverse rails 9 are so arranged as to position the cell-jars 3 in laterally spaced relationship so that all of the cell-jars are spaced from each other both longitudinally and laterally. The battery frame may be constructed of any suitable acid-resistant plastic material, such as that known by the trade-name "polystyrene," and is preferably pressed between suitable dies to its final form in a single operation.

The adjacent cells of each row are electrically connected by a "jumper" or couple 12 comprising a positive electrode 13 for one cell and a negative electrode 14 for the adjacent cell with a looped connecting strap 15 extending between the electrodes. The electrodes 13 and 14 may be made of any suitable combination of dissimilar metals, but preferably they comprise the usual combination of sponge lead and lead oxide in the form of pasted plates which are immersed in an acid electrolyte. Although the couples 12 may be made in any suitable manner they are preferably cast in a unitary structure. The couples 12 are of such dimensions that the positive and negative plates 13 and 14 fit into the cell-jars 3 with their edges frictionally engaging the side walls thereof and the couples are applied in proper position by merely sliding them into adjacent cell-jars until the connecting straps 15 seat on the top edges of the side walls 4 thereof or in suitable notches therein. Preferably, the electrode plates 13 and 14 are of such dimensions that their upper ends are below the top of the cell-jars 3 to overcome the tendency of the electrolyte to creep up the side walls of the cell-jars.

A modified form of couple 16 is provided at the end of each longitudinal row of cell-jars 3 with the positive and negative plates 13 and 14 and connecting strap cast in a common plane to adapt them to bridge the laterally adjacent cell-jars, see Fig. 1. In the end cells of the battery one positive plate 13 and one negative plate 14 are provided with terminals 17 and 18 connected thereto. Thus, all of the cells are connected in series to form a battery.

Separators 21 of wood or other suitable absorbent material are provided in each cell to retain the electrolyte and positively hold the positive and negative plates 13 and 14 of each cell in spaced relationship. In other words, the electrolyte in the form of a weak acid solution is held in mechanical suspension by the plates 13 and 14 and the separators 21 whereby to eliminate surplus acid which might escape through the open tops of the cells. Thus the possibility of seepage or spilling of electrolyte and short-circuiting of the cells is further reduced. One form of the invention having been described in detail its mode of operation and manner of use is explained as follows:

The parts of each cell are assembled in each of the cell-jars 3 by sliding the couples 12 and 16 into adjacent cell-jars, the individual positive and negative plates 13 and 14 in the end cell-jars and the separators 21 between the plates in each cell. The assembled battery may then be transported to its destination where it is to be used. When the battery is to be attached to a trial balloon the liquid electrolyte is inserted in each of the cell-jars and absorbed by the positive and negative plates 13 and 14 and separators 21, care being taken to prevent supplying a surplus quantity of the electrolyte to the jars. When dry charged plates are used the introduction of the electrolyte renders the battery immediately available to provide electric current for the radio or other apparatus with which it is to be used. If dry charged plates are not used the battery is cycled in a charging apparatus to charge the plates 13 and 14 after the electrolyte is supplied to the cells. Thus the battery incorporating the novel features of the present invention is adapted to operate with maximum efficiency and capacity in remote locations where the ordinary dry cell battery cannot be used because of deterioration during transport. Furthermore, the storage battery of the present invention is more efficient and reliable in use with trial balloons at any location because of its greater capacity. Due to the spacing of the cell-jars the problem of short-circuiting adjacent cells is practically eliminated.

Figs. 5, 6 and 7 illustrate a modified form of battery frame in which the cell-jars are maintained above the supporting structure to further facilitate the escape of any overflow of electrolyte and thereby reduce the possibility of short-circuiting adjacent cells. With the frame construction 29 illustrated in Figs. 5, 6 and 7 each cell-jar 30 is supported by a stem 31 depending from the bottom of the cell-jar and joined to a transverse rail 32 for supporting a row of the jars. The lateral rows of cell-jars 30 are connected by longitudinally extending rails 33 joined to the projecting ends of the rails 32 of the several rows. As stated above with respect to the form of the battery frame illustrated in Figs. 1 to 4, the longitudinally extending rails 33 may be located directly under the end cell-jars of each row instead of being laterally spaced therefrom to further reduce the weight and dimensions of the casing. In this form of construction the adjacent cell-jars 30 of each row may be electrically connected by the couples 12 and the end cells of each row joined by couples 16 in the same manner as explained above with respect to the first-described form of casing. The complete battery is adapted to be used in the same manner as the battery illustrated in Figs. 1 to 4.

Fig. 8 illustrates a modified form of construction of the cell-jars 40 for facilitating the operation of supplying electrolyte thereto and preventing overfilling. A series of the cell-jars 40 may be joined to each other in spaced relationship by rails 41 to provide rows and the rows of jars connected in the manner illustrated and described in Figs. 1 to 4 or 5 to 7. The adjacent cell-jars 40 of each row are connected by couples 12 and in this form of construction the upper edges of the side walls of the cell-jars have notched recesses 42 to receive the loop connecting straps 15. The plates 13 and 14 in each cell are held in spaced relationship by a separator 43. As an added feature the cell-jars 40 have extensions 44 depending below the supporting frame structure with central openings 45 which extend into the interior of the cell-jars. The opening 45 of each cell-jar 40 is of a length and width equal to the width and thickness of the separator 43 to adapt it to receive the lower portion thereof. The separators 43 are composed of a suitable absorbent material and extend from a position slightly above the top of the plates 11 and 12 downwardly below the lower ends of the plates to a point adjacent the bottom of the slots or openings 45 in the extensions 44.

With the form of cell-jar construction illustrated in Fig. 8 the separators 43 act as wicks to draw the acid electrolyte upwardly into the cells by capillary attraction. To this end a separate filling tray 46 is provided having a series of compartments 47 for holding a quantity of the acid electrolyte and the compartments are so arranged as to receive the reduced extensions 44 of the cell-jars which fit closely thereinto. Thus by placing the battery on the tray 46 with the lower ends of the separators 43 immersed in the electrolyte the latter is drawn up simultaneously into all of the cell-jars by capillary attraction to wet the positive and negative plates 13 and 14 and retain the required surplus of electrolyte in the separators. After the positive and negative plates 13 and 14 and separators 43 have become saturated no further electrolyte will enter the cells 40 so that overfilling is effectually prevented. As stated above, it is essential that no surplus electrolyte be contained in the cells of the battery when it is used with a trial balloon as the battery is subjected to excessive swaying and tilting which would cause the excess electrolyte to spill from the open tops of the cell-jars. With the form of cell-jar illustrated in Fig. 8 the total supply of electrolyte is retained in mechanical suspension in the plates 13 and 14 and separators 43 and no surplus acid is present which might spill from the cells.

It will be observed from the foregoing specification that the present invention provides a novel form of storage battery adapted for use with trial balloons or for other purposes requiring minimum size, extreme compactness, light weight and low cost of manufacture. It will be observed further that the battery of the present invention provides for eliminating the danger of short-circuiting of adjacent cells by seepage or spilling of the electrolyte over the cell walls. It will be observed still further that the present invention provides a novel form of electrical couple constituting the positive and negative electrodes of adjacent cells combined in a single unit.

While several forms of the invention are herein illustrated and described it will be understood that further modifications may be made in the structure and arrangement of the parts thereof without departing from the spirit or scope of the invention. For instance, although the battery illustrated has fifty cells it is to be understood that the number of cells may be increased or reduced in accordance with requirements. Therefore, without limiting myself in this respect, I claim:

1. In an electric storage battery for radio transmitting apparatus used with meteorological trial balloons, a unitary structure of insulating material comprising a series of individual cell-jars arranged in parallel rows and spaced apart both laterally and longitudinally of the rows without contact at their sides, said cell-jars connected at the bottom by an integral open-work grid consisting in longitudinal and lateral ribs of relatively narrow width and small depth spaced apart with relatively large openings therebetween, electrodes in each jar, and an electrolyte in each jar, said openings in the bottom of the structure providing for free passage of any electrolyte spilling or overflowing from the top of the jars in order to prevent leakage of electric current over the surface of one cell to that of another.

2. In an electric storage battery for radio transmitting apparatus used in meteorological trial balloons, a unitary structure of insulating material comprising a series of individual cell-jars arranged in parallel rows with spaces between their adjacent sides, said cell-jars connected by an integral open-work grid consisting in longitudinally-extending rails of relatively narrow width and small depth disposed centrally of the sides of the cell-jars at the bottom thereof to provide extended openings therebetween, the ends of said longitudinal rails being connected by lateral rails spaced from the sides of the jars at the ends of the rows, electrodes in each jar, and an electrolyte in each jar, said spaces between the cell-jars and the extended openings between the rails at the bottom of the jars providing for drainage of any electrolyte spilling over the sides of the jars in order to prevent leakage of electric current over the surface of one cell to that of an adjacent cell.

3. In an electric storage battery for radio transmitting apparatus used in meteorological trial balloons, a plurality of individual cell-jars arranged in parallel rows and spaced at a distance apart both laterally and longitudinally, said cell-jars joined at the bottom by relatively narrow ribs arranged centrally of the sides of the jars and formed integral therewith, said ribs being of triangular shape in cross-section tapered toward the top, electrodes in each jar, and an electrolyte in each jar, said spacing of the cell-jars providing for drainage of any electrolyte spilled over the top thereof between the jars and said triangular shape of the connecting ribs also tending to cause the electrolyte to drain from their sides to escape through the openings between the ribs in order to prevent the electrolyte from causing leakage of the electric current from one cell to another.

4. In an electric storage battery, a unitary grid-like frame of insulating material comprising a series of individual cell-jars arranged in parallel rows and having depending stems joined to longitudinally extending rails connecting the jars in spaced relationship in the rows and with integral transverse rails connecting the longitudinally extending rows in spaced relationship, electrodes in each jar, and an electrolyte in each jar, said spacing of the cell-jars preventing spillage or overflow of the electrolyte from short-circuiting adjacent cells.

ALBERT SETZER.